(12) United States Patent
Zhang et al.

(10) Patent No.: US 6,502,036 B2
(45) Date of Patent: Dec. 31, 2002

(54) 2-D INVERSION OF MULTI-COMPONENT INDUCTION LOGGING DATA TO RESOLVE ANISOTROPIC RESISTIVITY STRUCTURE

(75) Inventors: Zhiyi Zhang, Houston, TX (US); Alberto Mezzatesta, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 48 days.

(21) Appl. No.: 09/798,120

(22) Filed: Mar. 2, 2001

(65) Prior Publication Data
US 2002/0149997 A1 Oct. 17, 2002

Related U.S. Application Data (63) Continuation of application No. 09/676,097, filed on Sep. 29, 2000.

(51) Int. Cl.$^7$ .................................. G01V 3/18
(52) U.S. Cl. ........................................ 702/7
(58) Field of Search ................... 702/6, 7; 324/338, 324/339, 343

(56) References Cited

U.S. PATENT DOCUMENTS

| | | | |
|---|---|---|---|
| 5,452,761 A | 9/1995 | Beard et al. | 166/250 |
| 5,854,991 A | 12/1998 | Gupta et al. | 702/7 |
| 6,092,024 A | * 7/2000 | Wu | 702/7 |
| 6,147,496 A | 11/2000 | Strack et al. | 324/343 |

\* cited by examiner

Primary Examiner—Donald E. McElheny, Jr.
(74) Attorney, Agent, or Firm—Madan, Mossman & Sriram, P.C.

(57) ABSTRACT

High Definition Induction Logging (HDIL) tools provide reliable information about the vertical and radial variations of resistivity structure in isotropic media. Focusing techniques provide quantitative information about resistivity variation and qualitative information about invasion at the well site. Coaxial alignment of transmitter-receiver arrays with the borehole prevents obtaining information about anisotropy in vertical wells, thereby greatly limiting the application of array induction tools in the characterization of reservoirs with finely laminated sand/shale sequences. A multi-component induction tool, 3DEX™, enables the detection of anisotropy in laminated reservoirs. Multi-component data are invert to give an estimate of vertical and horizontal resistivity in a vertical borehole. 3DEX™ may encounter difficulties in looking through an invaded zone and detecting the anisotropy in the formations. Joint inversion of HDIL and 3DEX™ data enables identification of parameters of the invaded zone as well as of the anisotropic formations.

20 Claims, 6 Drawing Sheets

2-D INVERSION OF MULTI-COMPONENT INDUCTION LOGGING DATA TO RESOLVE ANISOTROPIC RESISTIVITY STRUCTURE

CROSS-REFERENCES TO RELATED APPLICATIONS

This application is continuation of U.S. patent application Ser. No. 09/676,097 filed on Sep. 29, 2000.

BACKGROUND OF THE INVENTION

1. Field of the Invention

The invention is related generally to the field of interpretation of measurements made by well logging instruments for the purpose of determining the properties of earth formations. More specifically, the invention is related to methods for 2-D inversion of induction logging data obtained with transverse induction logging tools.

2. Background of the Art

Electromagnetic induction and wave propagation logging tools are commonly used for determination of electrical properties of formations surrounding a borehole. These logging tools give measurements of apparent resistivity (or conductivity) of the formation that, when properly interpreted, are diagnostic of the petrophysical properties of the formation and the fluids therein.

The physical principles of electromagnetic induction resistivity well logging are described, for example, in, *H. G. Doll*, Introduction to Induction Logging and Application to Logging of Wells Drilled with Oil Based Mud, Journal of Petroleum Technology, vol. 1, p.148, Society of Petroleum Engineers, Richardson Tex. (1949). Many improvements and modifications to electromagnetic induction resistivity instruments have been devised since publication of the Doll reference. Examples of such modifications and improvements can be found, for example, in U.S. Pat. No. 4,837,517; U.S. Pat. No. 5,157,605 issued to Chandler et al, and U.S. Pat. No. 5,452,761 issued to Beard et al.

U.S. Pat. No. 5,452,761 to Beard et al. having the same assignee as the present application and the contents of which are fully incorporated herein by reference, discloses an apparatus and method for digitally processing signals received by an induction logging tool having a transmitter and a plurality of receivers. An oscillating signal is provided to the transmitter, which causes eddy currents to flow in a surrounding formation. The magnitudes of the eddy currents are proportional to the conductivity of the formation. The eddy currents in turn induce voltages in the receivers. The received voltages are digitized at a sampling rate well above the maximum frequency of interest. The digitizing window is synchronized to a cycle of the oscillating current signal. Corresponding samples obtained in each cycle are cumulatively summed over a large number of such cycles. The summed samples form a stacked signal. Stacked signals generated for corresponding receiver coils are transmitted to a computer for spectral analysis. Transmitting the stacked signals and not all the individually sampled signals, reduces the amount of data that needs to be stored or transmitted. A Fourier analysis is performed of the stacked signals to derive the amplitudes of in-phase and quadrature components of the receiver voltages at the frequencies of interest. From the component amplitudes, the conductivity of the formation can be accurately derived.

A limitation to the electromagnetic induction resistivity well logging instruments such as that discussed in Beard is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art, these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 6,147,496 to Strack et al. teaches the use of an induction logging tool in which at least one transmitter and at least one receiver are oriented in orthogonal directions. By operating the tool at two different frequencies, it is possible to substantially reduce the effect of invasion and to determine the orientation of the tool to the bedding planes.

U.S. Pat. No. 5,999,883 issued to Gupta et al, (the "Gupta patent"), the contents of which are fully incorporated here by reference, discloses a method for determination of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

Co-pending U.S. patent application Ser. No. 09/676,097 by Kriegshauser et al, the contents of which are fully incorporated herein by reference, teaches a method for determining an applying shoulder bed corrections to logging measurements made with a transverse induction logging tool. Layer boundaries are determined from the measurements. These are combined with horizontal and vertical resistivities obtained by a whole space anisotropic inversion to give a layered model. Preferably, a Lanczos iterative procedure is used for the inversion. The shoulder bed correction for each layer is derived based upon a difference between a 1-D synthetic response of the model and a whole space response of the model at that layer. The shoulder bed correction is applied to the data and the inversion procedure is repeated. This procedure is repeated in an iterative manner until a difference between the shoulder bed corrected measurements at the center of each of the layers and a synthetic response to a whole space model at the center of each of the layers is below a predetermined threshold.

Figure 1:
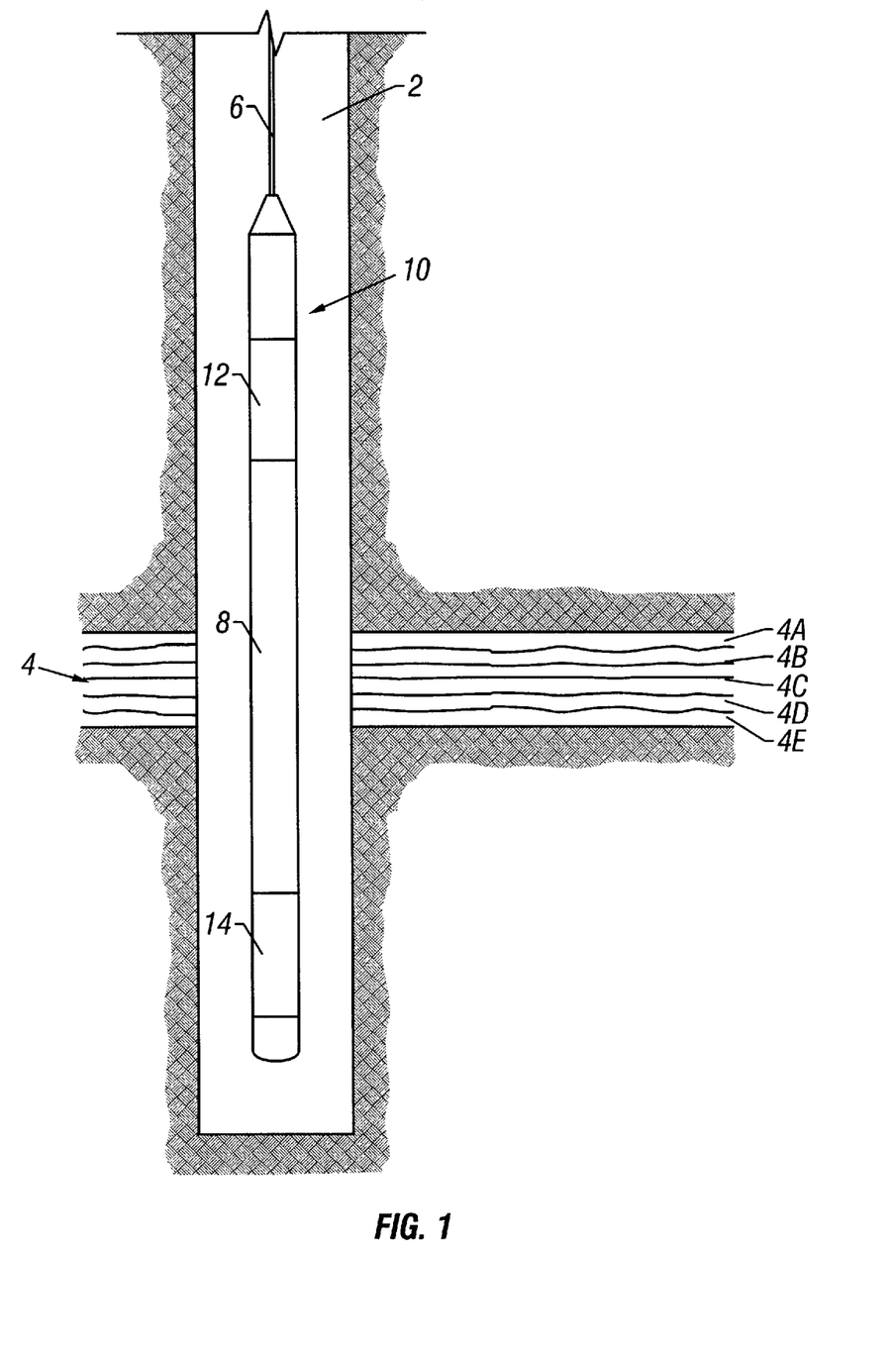
FIG. 1 shows an induction instrument disposed in a wellbore penetrating earth formations.

Kriegshauser teaches the use of a multicomponent induction logging tool in which five components of the magnetic field as shown in FIG. 1. This tool which is marketed under the name 3DEX™ by Baker Hughes Inc., measures three principal components $H_{xx}$, $H_{yy}$, $H_{zz}$ and two cross-components $H_{xy}$ and $H_{xz}$. The measured data from 3DEX™ tool are unfocused and thus inversion is necessary in interpreting the 3DEX™ data.

Only a few authors have attempted to invert borehole EM logging data to resolve anisotropic formation. Gupta et al. and Kriegshauser et al. have developed various inversion methods, including whole space inversion, radial 1D inversion, and vertical 1D inversion, to resolve anisotropic formations. EM logging data, however, are subject to borehole, shoulder, and invasion effects. The drilling mud coupled with the high pressure during the drilling process can create a flushed zone around the borehole that can be as thick as several meters. The approximate correction for borehole and shoulder effects using radial 1D and vertical 1D inversions alternatively in Kriegshauser et al., works reasonably well in most cases but these approximate corrections may not lead to satisfactory solutions in complicated situations such as high resistivity contrast and thin layers.

Additionally, different tools have different vertical resolutions and they respond differently to the earth models. Separate interpretations of multi-component induction tool and HDIL data, therefore, can lead to different and sometimes inconsistent results.

There is a need for a method of consistent interpretation of HDIL and 3DEX data to obtain anisotropic resistivities of the subsurface along with anisotropic resistivities of the invaded zone. The present invention satisfies this need.

SUMMARY OF THE INVENTION

A multi-component electromagnetic logging tool is used for obtaining multi-component measurements indicative of anisotropic resistivities of the subsurface. An initial model of the subsurface, including horizontal and vertical resistivities and parameters of an invaded zone around a borehole, is defined. A forward modeling program is used to obtain expected responses of the multi-component tool based on the initial model. An iterative procedure is used to update the model and minimize an objective function related to the mismatch between the model output and the multi-component measurements. The objective function also includes a model objective function to stabilize the inversion process. The initial model for the inversion may be obtained from other measurements, such as an array logging tool.

In another embodiment of the invention, the data from the multi-component logging tool are inverted jointly with data from an array logging tool. This joint interpretation can give results superior to those obtained from the inversion of the multi-component data alone. The improvement is noticeable in estimation of the invaded zone parameters.

DETAILED DESCRIPTION OF THE INVENTION

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity—related signals to the earth's surface along the cable 6 for further processing, or alternatively can store the conductivity related signals in an appropriate recording device (not shown) for processing after the instrument 10 is withdrawn from the wellbore 2.

Figure 2:
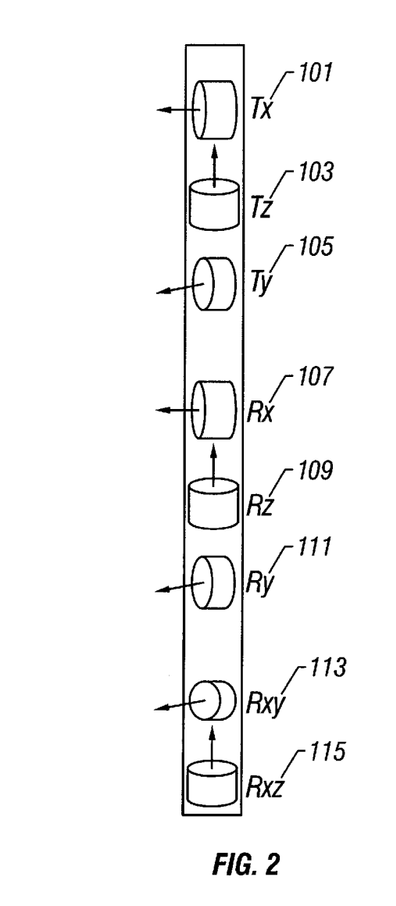
FIG. 2 shows the arrangement of transmitter and receiver coils in a preferred embodiment of the present invention marketed under the name 3DEX™.

Turning now to FIG. 2, the configuration of transmitter and receiver coils in a preferred embodiment of the 3DExplorer ™ induction logging instrument of Baker Hughes is disclosed. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields $H_{xx}$, $H_{zz}$, and $H_{yy}$. In addition, the receivers 113 and 115 measure two cross-components $H_{xy}$, and $H_{xz}$ of the magnetic field produced by the x-component transmitter.

Figure 3:
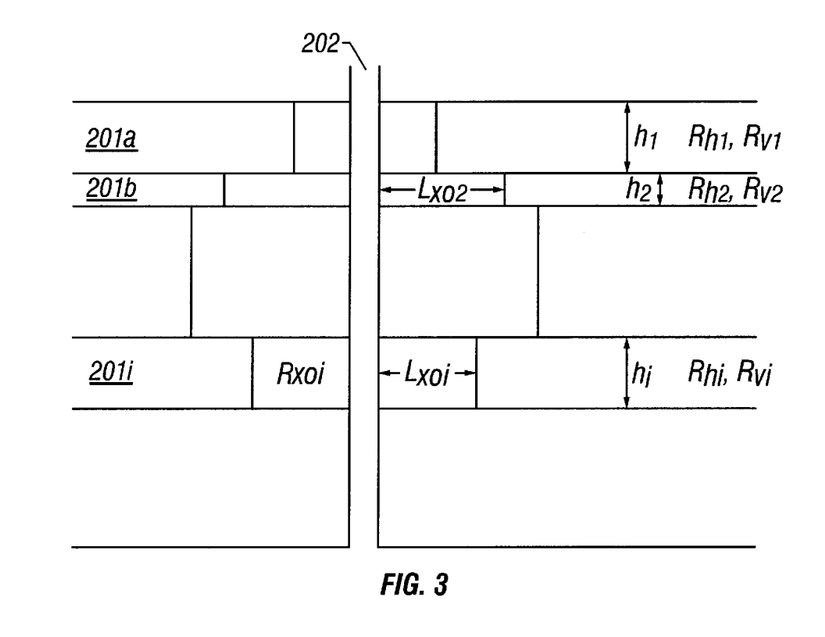
FIG. 3 shows examples of the response of some of the coils of the instrument of FIG. 3 to an anisotropic earth.

FIG. 3 is a schematic illustration of the model used in the present invention. The subsurface of the earth is characterized by a plurality of layers 201a, 201b, 201i. The layers have thicknesses denoted by $h_1$, $h_2$, ... $h_i$. The horizontal and vertical resistivities in the layers are denoted by $R_{h1}$, $R_{h2}$, ... $R_{hi}$ and $R_{v1}$, $R_{v2}$, ... $R_{vi}$ respectively. The borehole is indicated by 202 and associated with each of the layers are invaded zones in the vicinity of the borehole wherein borehole fluid has invaded the formation and altered is properties so that the electrical properties are not the same as in the uninvaded portion of the formation. The invaded zones have lengths $L_{xo1}$, $L_{xo2}$, ... $L_{xoi}$ extending away from the borehole. The resistivities in the invaded zones are altered to values $R_{xo1}$, $R_{xo2}$, ... $R_{xoi}$. In the embodiment of the invention discussed here, the invaded zones are assumed to be isotropic while an alternate embodiment of the invention includes invaded zones that are anisotropic, i.e., they have different horizontal and vertical resistivities. The assumption of an isotropic invasion zone is reasonable because in the case that the borehole fluid is conductive and invades a laminated sand/shale layer, then the pore fluid of the sand laminae is filled with conductive borehole mud fluid. This results in the sand laminae becoming as conductive as the shale laminae, thereby reducing anisotropy that would be produced by an interbedded sequence of thin layers with contrasting resistivity.

Figure 3A:
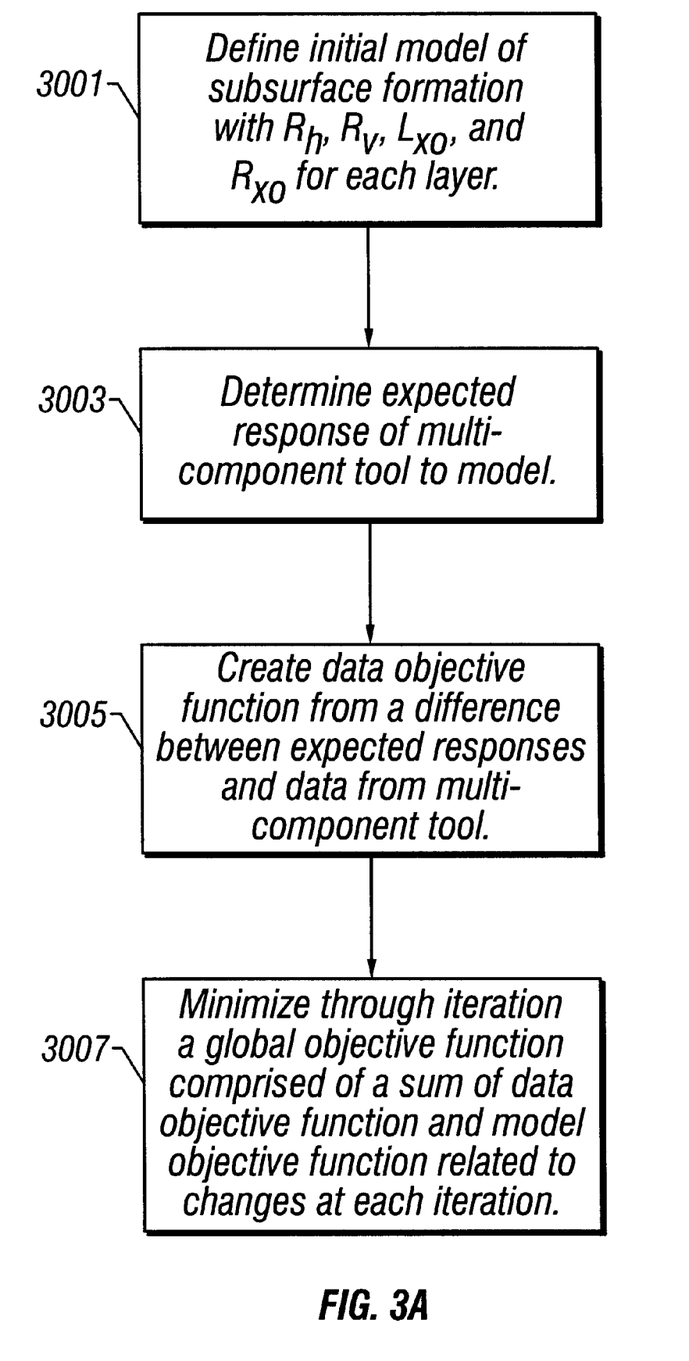
FIG. 3a shows a flowchart of the method of the invention.

FIG. 3a depicts a flowchart of the method of the invention. Initially, an initial model of subsurface formation is defined. This model comprises values for $R_h$, $R_v$, $R_{xo}$ and $L_{xo}$ for each layer within the model. This step is shown in Box 3001. In step 3003, the expected response of the multi-component tool to the initial model is determined. A data objective function is created that is derived from the difference between expected data responses and the data obtained from the multi-component tool. The data objective function is created in Box 3005. In step 3007, a global objective function is minimized, said global objective function being a sum of the data objective function of Box 3005 and a model objective function related to changes at each iteration.

Figure 4:
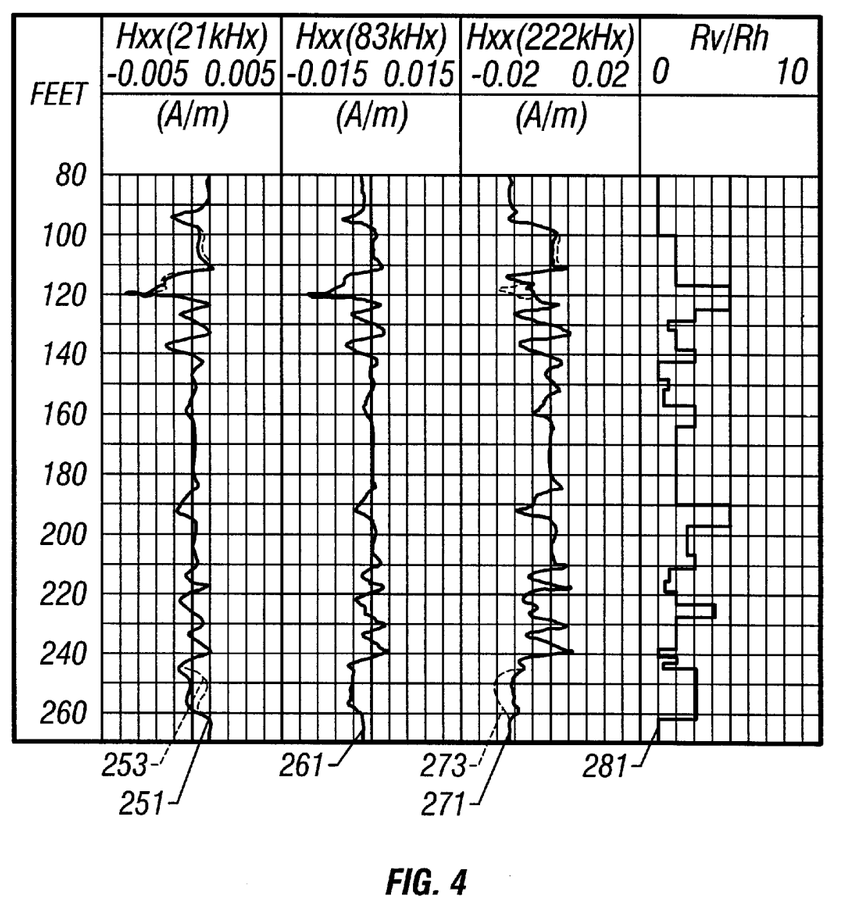
FIG. 4 shows an example of the response of the 3DEX™ tool to formation anisotropy.

FIG. 4 shows the response of a model in which the layers are anisotropic. The forward modeling we used in the inversion is the one described in Tamarchenko and Tabarovsky. This forward modeling algorithm takes advantages of the axially symmetric nature of 2D borehole problem and adopts a fast hybrid numerical technique that combines the integral equations and finite difference methods.

The curve 281 depicts the anisotropy ratio λ (ratio of vertical resistivity to horizontal resistivity) in the layers. The actual resistivity values are not shown. The $H_{zz}$ in a vertical borehole is insensitive to the vertical resistivity and is not shown. The curves 251, 261 and 271 show the $H_{xx}$ response to the model at frequencies of 21 kHz, 83 kHz and 222 kHz respectively. Also shown by dashed lines are corresponding $H_{xx}$ responses 253, 273 when there is no anisotropy in the layers. The current flow produced by a horizontal transmitter cuts across formation boundaries but also has regions where the current flow is parallel to formation boundaries. As a result of this, the $H_{xx}$ response depends on both the horizontal and vertical resistivities and is also more susceptible to shoulder effects than the $H_{zz}$ response. This, together with the effects of the invasion, results in the situation shown in FIG. 3 where little effect of anisotropy is seen on the $H_{xx}$ response. The most noticeable effect is at a depth of approximately 250 ft. where there is a thick layer (approximately 16 ft. in thickness) with a large anisotropy ratio of 3:1. This suggests that inversion of 3DEX™ data alone is not going to give accurate results.

In induction logging, the sources are magnetic dipoles and the secondary magnetic field is measured. In either case, the data, D, can be expressed as a nonlinear function of the physical parameter, m, via a nonlinear function, $f$ $$D = f(m) \tag{1}$$

where m is a model vector that comprises the layer thicknesses, the layer resistivities, and the length and resistivity of the invaded zones.

The inversion goal is to find a model that reproduces the data and exhibits the desired characteristics of the formation. The data objective function, $\phi_d$, is given by $$\phi_d = \|W_d(D^{obs} - D)\|^2 \tag{2}$$

where $D^{obs}$ and D are the observed and predicted data respectively, and $W_d$ is a weighting matrix for the data. If the noise in the data components is Gaussian and independent, then $W_d$ is a diagonal matrix whose elements are the reciprocal of the standard deviation associated with each datum. In many instances, the noise in the data will not be Gaussian independent; in such a case, the covariance of the noise may be used to derive a suitable weighting matrix $W_d$.

As in all inversion problems, the success of the results depends to some extent on the choice of the initial model. In a preferred embodiment of the invention, the bed boundaries and layers for initial model are derived using the short subarrays of the HDIL tool and the 3DEX™ tool. The initial values for the horizontal resistivities and the length and resistivities of the invaded zones are obtained using the HDIL tool in a conventional manner. The initial model is assumed to be isotropic, i.e., with vertical resistivities equal to the horizontal resistivities.

The most challenging part of the 2-D inversion is the appropriate handling of model parameters that have different physical units and different effects on the data. In the present invention, the choice of the model objective function is guided by the desire to find a model that has minimum structure in the vertical direction and at the same time is close to a reference model. To accomplish this, model objective functions for resistivity of the invaded zone and the length of invasion are defined as $$\phi_\rho = \alpha_\rho \int w_\rho \left| \ln\left(\frac{\rho}{\rho_0}\right) \right|^2 dv + (1 - \alpha_\rho) \int w_\rho \left| \frac{\partial (\ln\rho - \ln\rho_0)}{\partial z} \right|^2 dv \tag{3}$$

and $$\phi_l = \alpha_l \int w_l \left| \ln\left(\frac{l}{l_0}\right) \right|^2 dv + (1 - \alpha_l) \int w_l \left| \frac{\partial (\ln l - \ln l_0)}{\partial z} \right|^2 dv \tag{4}$$

where $\rho_0$ and $l_0$ are the reference models for resistivity and invasion length. The integration is with respect to vertical depth. In eqs. (3) and (4), ρ includes the horizontal and vertical resistivities as a function of depth as well as the resistivity of the invaded zone.

The two parameters, $\alpha_\rho$ and $\alpha_l$, control the relative importance of the smallest and flattest components in the model objective functions. They are decided automatically at each iteration by making the norms of eqs. (3) and (4) the same. The use of ln(ρ) and ln(l) ensures the non-negative solution of the recovered models and allows the model parameters for resistivity and invasion length to span the same numerical range in the inversion. The two weighting functions, $w_\rho$ and $w_l$ allow the user flexibility to incorporate a priori information about model parameters into the inversion. The discrete model objective functions, i.e., wherein the model consists of discrete layers within which the resistivities and invasion lengths are constant, can be written as $$\phi_\rho = \left\| W_\rho \ln\left(\frac{\rho}{\rho_0}\right) \right\|^2 \tag{5}$$

and $$\phi_l = \left\| W_l \left(\frac{l}{l_0}\right) \right\|^2 \tag{6}$$

where $W_\rho$ and $W_l$ are weighting matrices.

The model objective function for the inversion is then defined as $$\phi_m = \eta \phi_\rho + (1-\eta)\phi_l \tag{7}$$

wherein the coefficient $\eta$ is given by $$\eta = \frac{1}{1+s} \tag{8}$$

where $0 \leq s \leq \infty$ is the desired magnification factor of the length in the inversion process relative to the resistivity. Examination of eq. (8) shows that when s is zero, the model objective function is the same as the length resistivity objective function and when s is infinite, the model objective function is the same as the resisitivity objective function.

The global objective function for the inversion is a combination of the data objective function from eq. (2) and the model objective flunction from eq. (7). This may be written as $$\phi = \phi_m + \beta^{-1}(\phi_d - \phi^{tar}) \tag{9}$$

where $\beta$ is the Lagrangian multiplier and $\phi^{tar}$ is the target misfit level (a noise factor that specifies the acceptable misfit in the inversion process).

This nonlinear optimization problem may be solved using any suitable method, such as Newton-Raphson or Marquardt-Levenberg. The objective function at the n-th iteration is given by $$\phi = \|W_m[\delta m + m^{(n)} - m_0]\|^2 + \beta^{-1}\{\|W_d\{D^{obs} - f[m^{(n)}] + J\delta m\}\|^2 - \phi^{tar(n+1)}\}  \tag{10}$$

where m is the model vector comprising model parameters for resistivity and invasion length ($\rho$ and l above) and $J=(J_\rho, J_l)$ are the sensitivities for resistivities and invasion length respectively.

The global model weighting matrix is $$W = \begin{bmatrix} \sqrt{\eta}\, W_\rho & 0 \\ 0 & \sqrt{1-\eta}\, W_l \end{bmatrix} \tag{11}$$

In a preferred embodiment of the invention, the target misfit level is reduced by a factor between 2 and 10 from one iteration to the next.

The model is defined as a vector m $$m = [h_1 L_{x01} R_{x01} R_{h1} R_{v1} h_2 \ldots h_n L_{x0n} R_{x0n} R_{hn} R_{vn}]^T \tag{12}$$

where $^T$ denotes transpose and where ($h_i$, $L_{x0i}$, $R_{xoi}$, $R_{hi}$, $R_{vi}$) denote the thickness, length of the invaded zone, resistivity of the invaded zone, horizontal resistivity and vertical resistivity respectively for the i-th layer, there being a total of n layers in the model. In an alternate embodiment of the invention, the thicknesses of the layers are taken as fixed.

In one embodiment of the invention, the observations comprise measurements made with the 3DEX™ logging tool $$D^{obs} = [H_{xx1}H_{yy1}H_{zz1}H_{xy1}H_{xz1} \ldots H_{xxM}H_{yyM}H_{zzM}H_{xyM}H_{xzM}]^T \tag{13}$$

where the observations are made at a total of M depths. In another embodiment of the invention, the observations used in the iterative process also include the measurements made with the HDIL.

From a practical standpoint, it may be desirable to perform the iterations over a depth window centered over the observation depth. This limitation becomes important only when constrained by availability of memory and processing capability.

The iterative process requires the determination of a Jacobian matrix J of partial derivatives relating elements of the model vector to the elements of the observation vector $$J = \begin{bmatrix} J_{11} & J_{12} & \cdots & J_{1n} \\ J_{21} & J_{22} & \cdots & J_{2n} \\ \vdots & \vdots & \ddots & \vdots \\ J_{Ml} & J_{M2} & \cdots & J_{Mn} \end{bmatrix} \tag{14}$$

where $$J_{ik} = \frac{\partial D_i^{obs}}{\partial m_k} \tag{15}$$

EXAMPLE

Figure 5:
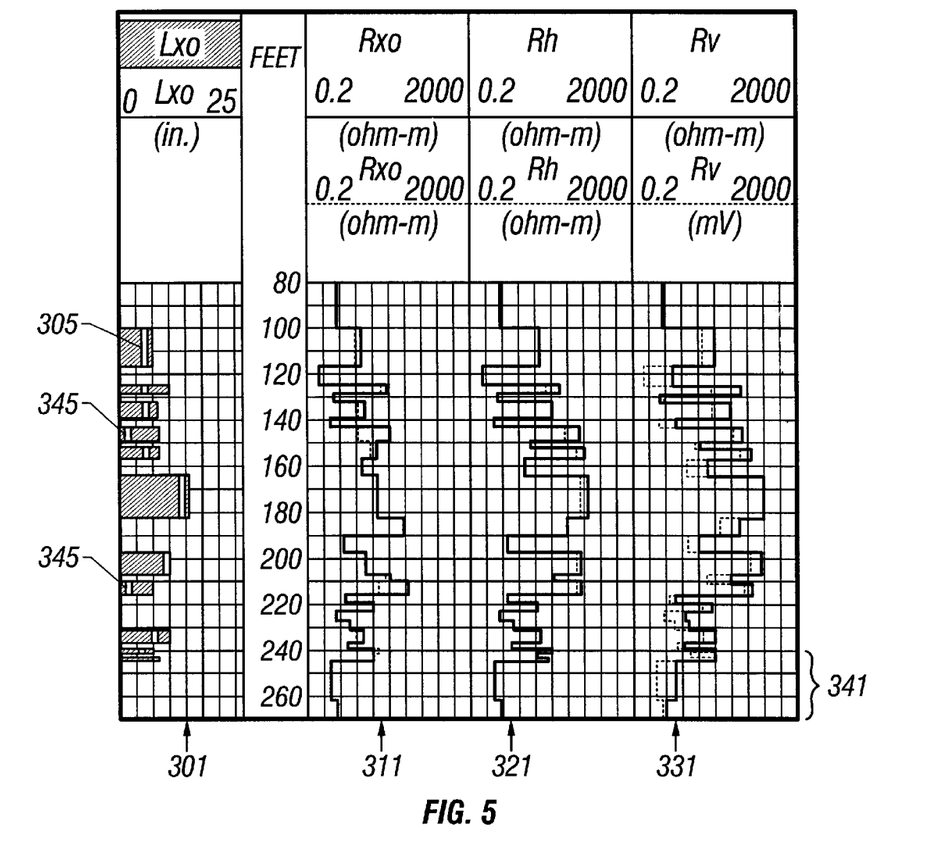
FIG. 5 shows the results of using the method of the present invention to invert data from the 3DEX™ tool.

Turning now to FIG. 5, the results of using the method of the present invention are shown. The shaded portion of left track 301 shows the model of the invasion zone that was used. The actual resistivity of the invasion zone is shown by the solid line in the track 311. The actual horizontal resistivity of the formation is shown by the solid line in track 321 while the solid line in track 331 shows the actual vertical resistivity of the layers.

Synthetic data were generated by forward modeling using the method given by Tamarchenko and Tabarovsky and 1% random Gaussian noise was added. Starting with an initial model in which the bed boundary locations are known and fixed, and with an initial isotropic model having a uniform resistivity of 1 Ωm for the formation and for the invaded zone, the data were first inverted using only the 3DEX™ data. The solid line in the track 301 is the inverted length of the invasion zone, the dashed line in track 311 is the inverted resistivity of the invasion zone, the dashed line in track 321 is the inverted horizontal resistivity while the dashed line in track 331 is the inverted vertical resistivity.

FIG. 5 shows that the inverted values of the horizontal resistivity $R_h$ agree quite well with the actual horizontal resistivity model: there is little difference between the solid and dashed lines in the track 321. The same is also true of the inverted resistivity of the invasion zone in track 311. However, the inverted vertical resistivity (dashed line in track 331) does differ somewhat from the actual vertical resistivity. Similarly, the invaded length of the invaded zone (solid line in track 301) differs from the actual invaded zone (shaded portion in track 301). Errors in the inverted length of the invasion zone are noticeable at depths indicated by 345 while at depth indicated bn 341, a fairly thick interval has some error in determination of vertical resistivity. Nevertheless, using only the 3DEX™ measurements, the inverted model does identify the zones with high anisotropy. Identification of these anisotropic zones is of considerable value in formation evaluation.

Figure 6:
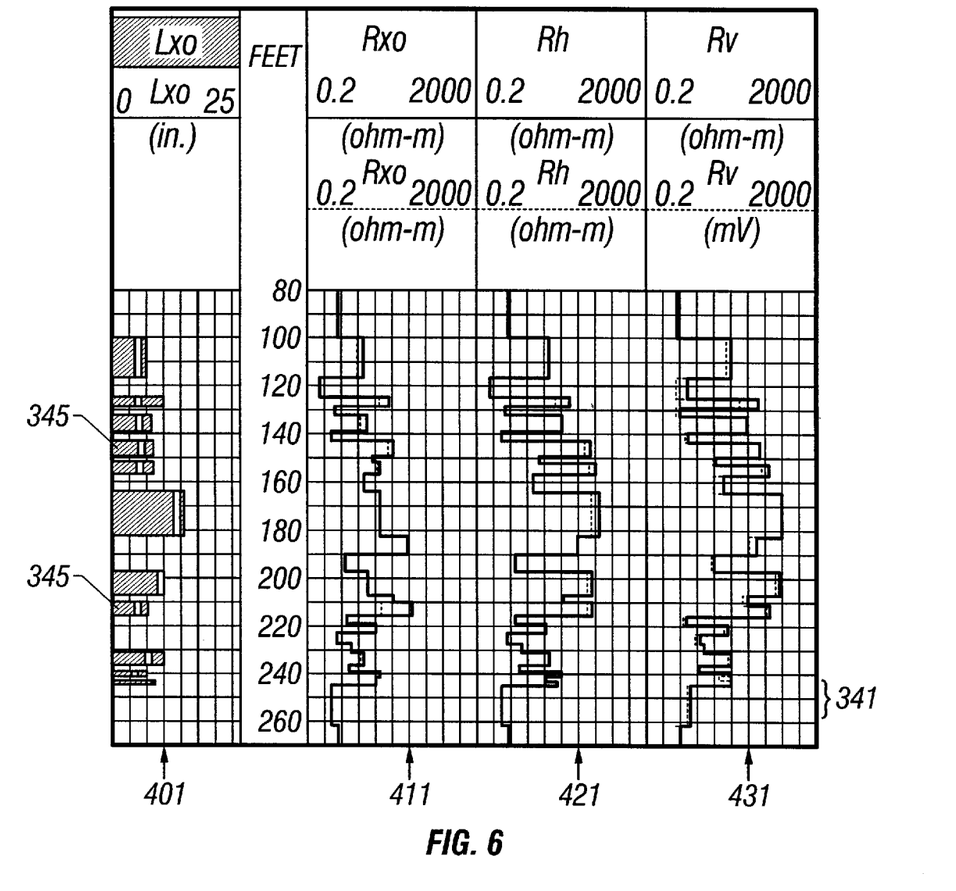
FIG. 6 shows the results of using the method of the present invention to jointly invert data from the 3DEX™ tool and an array Induction tool.

The process of inversion of the model output was then repeated using all of the data, i.e., by including the 3DEX™ data as well as the HDIL data. The latter data set would include measurements using the HDIL data at seven different spacings and eight different frequencies. The results of this inversion are shown in FIG. 6. As in FIG. 5, the left track 401 shows the invasion length (shaded for true values, solid line for inverted values), the track 411 shows the resistivity of the invaded zone (solid for true values and dashed for inverted values), the track 421 shows the horizontal resistivity (solid for true values and dashed for inverted values) and the track 431 shows the vertical resistivity (solid for true values and dashed for inverted values). FIG. 6 shows that the inverted values of invasion length and the vertical resistivity are much closer to the true values than in FIG. 5 where only the 3DEX™ data were used. In particular, the depths 345 shows considerable improvement in the inverted values of the invasion zone length, and the depth range 345 shows a much improved inversion of the vertical resistivity.

The method of the present invention has been illustrated above using a simple model in which the layer boundaries are kept fixed and the model includes invaded zones. The method has also been tested to invert models in which the layer boundaries are also allowed to be changed during the inversion process, and wherein there are two different invaded zones at each depth. Such a situation might occur if there is an invaded zone and a flushed zone in the formation. Results have been comparably, showing that the joint inversion of multicomponent (3DEX™) and multiple array induction tools (HDIL) gives results superior to those from multicomponent tools alone.

The present invention has been discussed above with respect to measurements made by a transverse induction logging tool conveyed on a wireline. This is not intended to be a limitation and the method is equally applicable to measurements made using a comparable tool conveyed on a measurement-while-drilling (MWD) assembly on a drillstring or on coiled tubing.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of logging of subsurface formations including a plurality of layers each having a horizontal resistivity and a vertical resistivity, the method comprising:
   (a) using a multi-component electromagnetic logging tool in a borehole in the subsurface formations for obtaining multi-component measurements indicative of said resistivities of said layers, said borehole associated with an invaded zone in said layers;
   (b) defining an initial model of said plurality of layers, said initial model including, for each of said plurality of layers,
      (i) a horizontal resistivity,
      (ii) a vertical resistivity,
      (iii) a length of the invaded zone, and
      (iv) a resistivity of said invaded zone;
   (c) determining expected responses of the multi-component logging tool to said model;
   (d) defining a data objective function related to a difference between said expected responses and said measurements made with the multi-component logging tool;
   (e) iteratively updating said model thereby reducing a global objective function, said global objective function comprising a sum of said data objective function and a model objective function related to changes in said model at each iteration.

2. The method of claim 1 wherein said electromagnetic logging tool is conveyed on one of (i) a wireline, (ii) a drillstring, and (iii) coiled tubing.

3. The method of claim 1 wherein said measurements made with said multi-component logging tool measures comprise $H_{xx}$, $H_{zz}$ and $H_{xz}$ measurements.

4. The method of claim 1 wherein said multi-component measures further comprise $H_{yy}$ and $H_{xy}$ measurements.

5. The method of claim 1 wherein defining said initial model further comprises using measurements from an array logging tool and deriving the initial model from said array resistivity measurements.

6. The method of claim 1 wherein determining said expected responses further comprises using a forward modeling program.

7. The method of claim 1 wherein defining said global objective function further comprises estimating a covariance of noise present in said multi-component measurements.

8. The method of claim 1 wherein said model objective function includes a relative weight between resistivity components and length components.

9. The method of claim 1 wherein iteratively updating the model further comprises defining a sensitivity matrix relating the observations to model parameters.

10. The method of claim 1 wherein iteratively updating said model further comprises windowing of said measurements.

11. A method of logging of subsurface formations including a plurality of layers each having a horizontal resistivity and a vertical resistivity, the method comprising:
   (a) using a multi-component logging tool in a borehole in the subsurface formations for obtaining multi-component measurements indicative of said resistivities of said layers, said borehole associated with an invaded zone in said layers;
   (b) using an array logging tool in said borehole for obtaining additional measurements primarily indicative of said horizontal resistivity and properties of said invaded zone;
   (c) defining an initial model of said plurality of layers, said initial model including, for each of said plurality of layers,
      (i) a horizontal resistivity,
      (ii) a vertical resistivity,
      (iii) a length of the invaded zone, and
      (iv) a resistivity of said invaded zone;
   (c) determining expected responses of the multi-component logging tool and the array logging tool to said model;
   (d) defining a data objective function related to a difference between said expected responses and said measurements made with the multi-component logging tool and the array logging tool;

(e) iteratively updating said model thereby reducing a global objective function, said global objective function comprising a sum of said data objective function and a model objective function related to changes in said model at each iteration.

12. The method of claim 1 wherein said multi-component logging tool and said array logging tool are conveyed on one of (i) a wireline, (ii) a drillstring, and (iii) coiled tubing.

13. The method of claim 11 wherein said measurements made with said multi-component logging tool measures comprise $H_{xx}$, $H_{zz}$ and $H_{xz}$ measurements.

14. The method of claim 12 wherein said measurements made with said multi-component logging tool further comprise $H_{yy}$, and $H_{xy}$ measurements.

15. The method of claim 11 wherein defining said initial model further comprises using measurements from the array logging tool.

16. The method of claim 11 wherein determining said expected responses further comprises using a forward modeling program.

17. The method of claim 11 wherein defining said global objective function further comprises estimating a covariance of noise present in said multi-component and array logging measurements.

18. The method of claim 11 wherein said model objective function includes a relative weight between resistivity components and length components.

19. The method of claim 11 wherein iteratively updating the model further comprises defining a sensitivity matrix relating the observations to model parameters.

20. The method of claim 11 wherein iteratively updating said model further comprises windowing of said measurements.

* * * * *